United States Patent [19]

Seibt et al.

[11] Patent Number: 4,884,204

[45] Date of Patent: Nov. 28, 1989

[54] MICROCOMPUTER SYSTEM FOR REGULATING INTERNAL COMBUSTION VEHICULAR ENGINES

[75] Inventors: Artur Seibt; Alois Kainz, both of Wien, Austria

[73] Assignee: Voest-Alpine Automotive Gesellschaft mbH, Linz, Austria

[21] Appl. No.: 893,656

[22] Filed: Aug. 6, 1986

[51] Int. Cl.[4] ...................... G06F 15/16; G06F 13/38
[52] U.S. Cl. ................. 364/431.03; 364/133; 364/931.46; 371/9.1
[58] Field of Search ............... 364/131, 132, 133, 134, 364/431.11, 431.03, 431.12, 200, 900; 371/9

[56] References Cited

U.S. PATENT DOCUMENTS

| | | | |
|---|---|---|---|
| 3,710,324 | 1/1973 | Cohen et al. | 340/172.5 |
| 4,065,809 | 12/1977 | Matsumoto | 364/200 |
| 4,112,490 | 9/1978 | Pohlman | 364/200 |
| 4,212,057 | 7/1980 | Devlin et al. | 371/9 |
| 4,532,594 | 7/1985 | Hosaku et al. | 364/431.11 |
| 4,556,942 | 12/1985 | Russo et al. | 364/431.07 |
| 4,556,943 | 12/1985 | Pauwels et al. | 364/431.12 |
| 4,558,416 | 12/1985 | Pauwels et al. | 364/133 |
| 4,628,436 | 12/1986 | Okamoto et al. | 364/131 |

FOREIGN PATENT DOCUMENTS

| | | |
|---|---|---|
| 0127789 | 12/1984 | European Pat. Off. . |
| 3137313 | 3/1983 | Fed. Rep. of Germany . |
| 0130108 | 8/1982 | Japan ............................ 364/431.03 |
| 0023203 | 1/1986 | Japan ............................ 364/431.03 |

OTHER PUBLICATIONS

"Elektronik-Fachteil, Multibusarchitektur und Kartencomputersysteme", Elektroniker, Nr. 19/1983, pp. 49-62.

"Mikrocomputer, Multi-Mikroprozessor-Systeme:," Hermann Schmid, Elektronik, 2/29.1.1982, pp. 87-95.

*Primary Examiner*—Felix D. Gruber
*Assistant Examiner*—Ellis B. Ramirez
*Attorney, Agent, or Firm*—Thomas R. Vigil

[57] ABSTRACT

This microcomputer system can be used, for example, in a regulator for internal combustion engines for controlling and regulating the fuel injection and other functions in a motor vehicle in dependence on operating magnitudes. Exemplary controlled functions include engine revolutions, charging pressure, gas pedal position, etc. The controlled functions are determined with the aid of sensors connected with the microcomputer system. The outputs of the microcomputer are connected with servo members, signal displays or the like, which may be energized by drive circuits. The system functions are distributed over the individual microcomputers (1, 2, 3), and a parameter storer (5) is provided for, for example, motor-specific and vehicle-specific data.

The system includes individual microcomputers (1, 2, 3) and a parameter storer (5), preferably constructed as a pluggable module, which are connected to a combined, bidirectional address and data bus (4) isolated from the microcomputer-internal address and data buses, and is designed exclusively for the exchange of data among the digital components of the system. The system is extremely resistant to electromagnetic interference making it particularly suitable for motor vehicles.

9 Claims, 1 Drawing Sheet

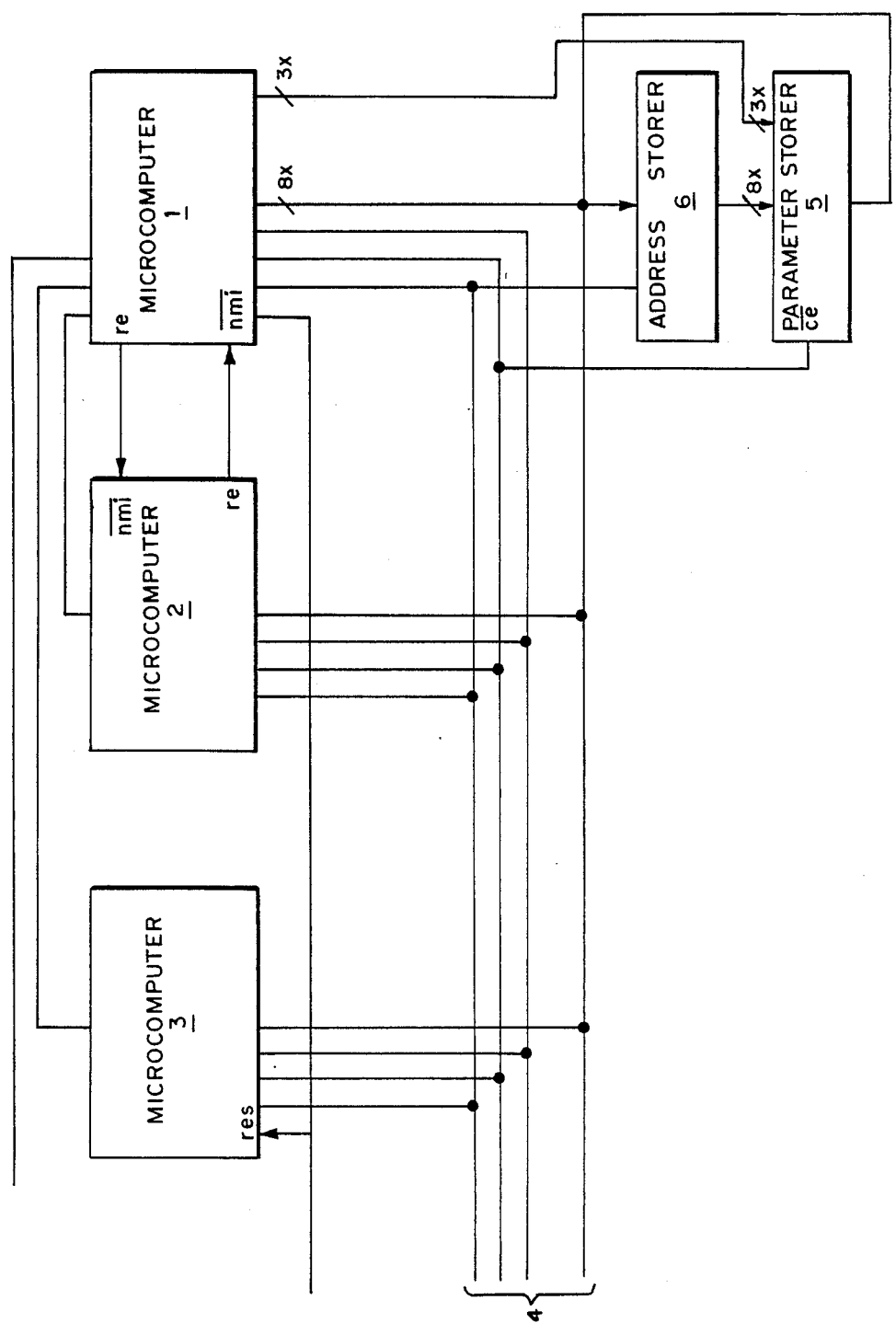

MICROCOMPUTER SYSTEM FOR REGULATING INTERNAL COMBUSTION VEHICULAR ENGINES

BACKGROUND OF THE INVENTION

The present invention relates to a microcomputer system, for example, for use in a regulator for internal combustion engines in controlling and regulating the fuel injection and other functions in a motor vehicle in dependence on operating magnitudes of various parameters. Exemplary parameters are engine revolutions, charging pressure, gas pedal position, etc., which are determined with the aid of measuring value sensors. Sensor signal lines are connected with the microcomputer system. Outputs of the microcomputer to include drive circuits, are connected with servo members, signal displays or the like. The microcomputer system includes at least two microcomputers. The function of each system is distributed over the individual microcomputers, and a parameter storer (memory) is provided, for example, for data specific to the motor and the vehicle.

Microcomputer systems are used in many fields and in consequence of the steadily growing demands in respect to the rapid processing of much data. The systems are becoming more and more complex, and in most cases, increased demands are also placed to achieve low error rate and high reliability. In the following, this set of problems is discussed with the example of a regulator for diesel motors, but similar problems arise in many other areas, for example, in the field of medical apparatus.

Many parameters may be controlled with the aid of a regulator. For example, in diesel motors, the amount of injected fuel, the injection time point, the gas feedback, etc., are controlled in dependence on various sensed parameters. Drive circuits, for example, through a stepping motor, operate the setting rod of the injection pump. From various sensors, operating data are fed to the microcomputer system, such as, for example, the engine revolutions, the water temperature, the charging pressure, the fuel temperature, etc.

A regulator for a diesel engine requires much greater reliability than those previously employed for gasoline engines. An unloaded diesel motor can be destroyed with even a very small amount of excess injected fuel leading to excessive engine revolutions or a runaway. In the case of faulty behavior of the regulators, however, serious accidents are possible even before the diesel motor reaches a turning speed that leads to its destruction. Safety arrangements that have hitherto become known, which in parallel to the regulator electronic system proper, provide for the stopping of the motor on exceeding of a limit speed, do not suffice. It is desirable to enhance protection against engine runaway. As is known, one could have two computers operate in parallel and compare the result. Such a use of computers, however, is highly uneconomical, and the comparison only indicates that the result is erroneous. In general, a comparison of two computers does not say which of the two computers is operating faultily and which is correct.

One of the specific problems in use of microcomputers in motor vehicles lies in electrical interference, which can often lead to a faulty behavior of the system or a total program failure. The regulators that have hitherto become known, operate with a single microcomputer and mostly with external program memory (EPROM).

These so-called "multi-chip microcomputer systems" are those in which the address and data buses are led out as in a microprocessor. As a result of these external buses, the multi-chip microcomputer systems are extremely susceptible to electrical interferences. Data communication on address and data buses occur very rapidly at low signal levels, rendering the communication susceptible to interference. Any relatively great interference peak can lead to a program or data falsification, or to a total collapse of program, or crash.

Known watchdog circuits can be employed to restart a microcomputer after detecting a potential crash. Essentially, the watchdog circuits are counters with a certain counting capacity which are reset again and again on the starting value by a resetting signal generated with software from the microcomputer. In a crash, one hopes that the resetting signal in the software ceases, so that the counter finally overflows. As a result, the microcomputer is reset at its reset input and begins the program entirely from the beginning. Unfortunately, this method is not certain, for watchdog circuits are not triggered by all faults.

Any microcomputer has a finite number of input and output ports. The ports required for the control of external components, such as, for example, program storers, are lost for the input/output lines of the microcomputer. It is often desirable to recover ports by adding so-called port-extension components with increased expenditures of costs and space and usually less performance. Port-extension components lead to a larger current supply and possibly to a larger microcomputer housing to include cooling ribs. For example, to connect an external 4K program storer, there are needed first of all 13 address lines and eight data lines, whereby altogether there are lost 21 terminals (ports) for the control of the apparatus proper. Most usual commercial microcomputers have only 32 terminals total, so that only 11 terminals remain for the control inputs and outputs.

It is a further known practice to connect several processors to common buses with common storers. It is also a known practice to connect one-chip microcomputers with one another. Serial interfaces are often provided on the chip for such interconnection. Insofar as parameter values are contained in separate storers, these are driven over the buses present. More frequently, the parameter values and the program are contained in the same storer.

A regulator for internal combustion engines that has become known from European EP-A-127,789, contains exactly two microprocessors, over which there are distributed the various assignments. Between the two processors, there is provided a bus system. A "Personality Prom" in this system, contains motor-specific or vehicle-specific data and communicates over an additional bus with the first microprocessor. Therefore, only the first microprocessor can directly access the parameter storer. The second microprocessor must communicate with the program storer through the first microcomputer. As a result, the first microprocessor is additionally burdened and, the access times to the parameter storer become longer.

In "Electronik" (1982), No. 4, pages 55–62, there are described various multi-microprocessor systems. A common storer (FIG. 6 of the literature reference) communicates with individual microprocessors over a common bus. The common bus like a computer-internal bus, carries the entire data and address traffic, i.e., also the program information. Unfortunately, this externalization of the internal bus is very susceptible to interference as discussed above.

SUMMARY OF THE INVENTION

It is the aim of the present invention to create a microcomputer system which, with a high and universal performance capacity, provides a high resistance to interferences and is advantageous with regard to security, costs, dependability and space requirements. The system is particularly suitable for employment in motor vehicles.

This aim can be achieved with a microcomputer system of the type described above. In the present invention, both the individual microcomputers and also the parameter storer are preferably constructed as pluggable modules, and are connected to a combined, bidirectional address and data bus. The combined bidirectional address and data bus, in contrast to prior systems, is isolated from the address and data buses of the individual computers which are not connected with the outside world. They lie rather on chips of a few square millimeters in size. The advantage of this lies in virtually complete interference immunity, where it is virtually impossible for the program to collapse from interference. In the case of a diesel motor regulator, such a crash can lead to engine runaway. The prior conventional systems cannot be reliably protected, even by expensive shielding measures or interference filters and therefore, employ watchdog circuits or the like.

In the present invention, the distribution of the assignments over different computers means, first of all, that all these computers can operate simultaneously in a form of parallel processing. If only a single computer is present (however powerful), then each of the assignments must be ordered among the others in a complicated program structure, since the computer can at each time process only a single assignment in serial processing. The advantage of the assignment distribution over different computers is application is present. The signals must be processed in rapid sequence with constant monitoring of all the functions to detect any faulty behavior and, if need be, to trigger an emergency shut-off device for the motor.

The combined bidirectional address and data bus provides for internal communication between the individual computers and the parameter storer, which is accessible to all the computers. This isolated bus is not directly connected with the internal address and data buses of the individual computers. By means of software, certain connections (ports) of all the computers have this communication function allocated to them. The data traffic on the isolated bus is, in comparison to the internal data flow on the address and data buses of the computers, extremely slow and for this reason relatively immune to interference. Both the data in the storer and any data transfer is data-secured for error detection with known methods, to detect malfunctions, for example, short circuits, interruptions, storer defects, etc.

The parameter storer may be readily programmed to adapt a regulator to the particularities of a given motor or vehicle.

If between the parameter storer and the combined address and data bus, a flank-triggered (strobed) address storer is engaged, the probability that a disturbance will coincide with the interrogation beat flank (strobe) is extremely slight, so that a disturbance of the program through a port becomes virtually impossible.

Further, a control line is provided between a (first) microcomputer and the parameter storer for a number of address bits. In this manner, the first microcomputer has a selective preferential access to the parameter storer, which is expedient since the first microcomputer preferably performs the essential regulation functions and drives the external communication. Mutual control of the microcomputers and obviation of a faulty behavior in the communication between the individual computers is provided by one or more of the microcomputers having their restart outputs connected with the unmasked interrupt-inputs of other microcomputers.

This interconnection prevents the computer from being shifted into a starting state as in the case of a "reset" as a result of an error. A return to a starting state would reset peripherals to their initial states and would lead to long recovery times of the computer, which, for example, in a real time use such as a motor vehicle would be intolerable.

The present invention, together with further advantages and features, is described in detail in the following with the aid of an examplary drawing showing the block circuit diagram of a micro-computer system according to the invention.

BRIEF DESCRIPTION OF THE DRAWING

FIG. 1 is a block schematic of a microcomputer system of the present invention.

DETAILED DESCRIPTION OF THE DRAWING

In the embodiment of the microcomputer system represented, there are shown three microcomputers 1, 2, 3 for an internal combustion engine regulator. Additional microcomputers could be employed. Software-generated data traffic among the individual microcomputers is communicated along a combined bidirectional address and data bus 4, which presents several control lines nd is connected to the terminals of the individual microcomputers. The control lines perform, for example, the functions Busy, Request/Ready, Output Enable, etc The data traffic over the bus 4 occurs, as compared with the data traffic on the address and data buses of the individual microcomputers, extremely slowly. As a result, the system is relatively immune to electromagnetic interference. The internal computer data buses proper, remain restricted to the few square millimeters of the chips and are not subject to interference. All the microcomputer inputs and outputs connected with bus 4 are through microcomputer ports, which are interrogated relatively rarely by the program. The interrogation occurs internally in the microcomputer by strobing of a D—flipflop which accepts the data from the bus only during the strobe interval and thus isolates bus 4 from the internal buses. The probability that interference will coincide with the interrogation strobe is extremely slight. If this coincidence should nevertheless occur, then the probability of a repetition is very slight. The program cannot be easily disturbed by such coincidences if care is taken that the data is tested with known error detection techniques, so data disturbances can be detected and rendered harmless.

A parameter storer (memory) 5 is provided to accomodate the system to the specific requirements of a vehicle or engine. On the input side of parameter storer 5 an address storer 6 is connected. The parameter storer 5 is available to all the microcomputers through bus 4, but the first microcomputer 1 is preferred, or given priority. Microcomputer 1 performs the essential regulating assignment and drives the external communication as is further explained below. In communicating, a microprocessor issues, for example, an eight bit address word to the address storer 6. The address word is then charged into address storage (octal latch), which then accesses these values on the address inputs of the parameter storer 5. The bus 4 is then switched to input, following which the parameter storer 5 is activated by applying the feed voltage to the input "Output enable" or the like. Preferably, the feed voltage is applied to parameter storer 5 (preferably a PROM) through a transistor switch (not shown) to reduce heating and to enhance reliability. As a result, the parameter storer 5 switches onto the bus 4, and the microcomputer concerned reads the bus 4. The upper three address bits must be applied over a control line (3x) from the microcomputer 1. Microcomputers 2, 3 must first establish communication with the first microcomputer 1 if they wish to address the parameter storer 5. When a random access memory 5 is present in the parameter storer 5, microcomputer 1 can also write into the parameter storer 5. Additionally, microcomputer 1 can also pass on the storer content over the external communication to the outside. The data can be secured according to known methods, so that errors caused by interruptions, short circuits, interferences etc. are detected. In this manner, the regulator cannot operate with false data, which could lead to engine runaway or other malfunction.

It is also essential that the individual programs or assignments that are to be performed by the microcomputer system are distributed over the individual microcomputers. With several parallel operating microcomputers, there can be achieved an incomparably higher performance than with a single larger microcomputer. In a microcomputer the assignments allocated to it are serially processed. For motor regulation with real-time functions, rapid events must be processed and certain signals, such as, for example, the control signals for the regulating rod of a diesel engine must be rapidly issued. If a single microcomputer is used the priority of application or subprograms must be changed constantly with interrupts to a running application program which should be interrupted by programs of higher priority. Such system programs are very complex and necessarily result in the delay of some application program's execution. Through the use of several independent microcomputers, however, application programs can operate simultaneously undisturbed and be devoted directly to real-time assignments by parallel processing of the application programs.

In the system of the invention there can be allocated to the microcomputer 1, for example, the following assignments: regulation, detection of the signals from pressure sensors, temperature sensors, gas pedal sensors, visual displays, external communication, and control of the internal communication and direct access to the program storer. Microcomputer 1 polls the data bus 4 and the plurality of microprocessors to configure the system. Additionally, the microcomputer 1 might also take over the exhaust gas return of the internal combustion engine.

The second microcomputer 2 can be employed, for example, to drive a servo motor (step motor) for the injection pump, to control the servo motor feedback means and the processing of its signals. Additionally, the second microcomputer monitors engine revolution, control inputs and lamps. Further assignments can be allocated to the microcomputer 3 and possibly to a fourth microcomputer (not shown).

By the distribution of the assignments, it becomes possible to drive other servo members which operate, for example, valves, to change the injection time point or to shift an exhaust gas return valve, or to influence the rest of the regulator. It is only necessary to program the microcomputer and to change the connected hardware. In this manner, it is possible to conveniently and rapidly adapt the system to differing engines and vehicles with minimal expenditure for software. The distribution of the assignments among a number of one-chip microcomputers in a regulator allows economic assumption of functions formerly performed by dedicated devices. As a need arises, other microcomputers may be connected to the internal bus 4 and given access to all sensor and regulator data. Direct commands can be given to the regulator to maintain a maximum turning speed as is desired while avoiding great expenditure for external data traffic.

Despite the distributed assignments, some aspects of mutual control of the microcomputers is maintained. Internal data traffic runs intensively and can be maintained by the software so that it becomes evident, in milliseconds, if a microcomputer is not operating properly. As shown in the drawing, mutual synchronization of two microcomputers can be accomplished by connecting the restart-output (re) of the one microcomputer 1 with the unmaskable interrupt input (nmi) of another microcomputer. If one microcomputer is no longer functioning properly, the other microcomputer issues a restart command to the (nmi) input of the malfunctioning microcomputer in order to place the program in the malfunctioning microcomputer at the initial address. After repeated attempts to restart, if it is not possible to bring the malfunctioning microcomputer to correct operation, then the regulator can either go into an emergency operation, or carry out an emergency switching.

As described above, the microcomputer system for regulating internal combustion vehicular engines has a number of advantages, some of which have been described above and others of which are inherent in the invention.

Also, modifications can be made to the microcomputer system for regulating internal combustion vehicular engines without departing from the teachings of the present invention. Accordingly, the scope of the invention is only to be limited as necessitated by the accompanying claims.

We claim:

1. A microcomputer system for parallel processing of data and instructions, for regulating an internal combustion vehicular engine and for indicating engine status comprising:

a plurality of microcomputer modules including a first module with a microcomputer therein having internal buses for performing first priority assignments and at least a second microcomputer module with a microcomputer therein having internal buses for performing second priority assignments;

a pluggable parameter storer module having a storer/memory therein which is programmable in accordance with the specific requirements of the vehicle, the engine, the assignments of each of the microcomputers, and the priority of same; and a combined bidirectional address and data bus for interconnecting said microcomputers for data transfer among said microcomputers while maintaining isolation of said combined bidirectional address and data bus from the internal buses of said microcomputers to provide substantial immunity from noise interference and further for interconnecting each of said microcomputer modules and said parameter storer module in a manner whereby said first microcomputer has first priority of access to said storer/memory for performing first priority assignments; and storer module being pluggable into said bidirectional address and data bus whereby the system easily can be modified for another engine or vehicle.

2. Microcomputer system according to claim 1 wherein each microcomputer has restart output means, which are connected with unmaskable interrupt inputs of the other microcomputers.

3. The microcomputer system according to claim 1 further including a control line between the first microcomputer and the parameter storer for some of the address bits.

4. Microcomputer system according to claim 3 wherein each microcomputer has restart output means, which are connected with unmaskable interrupt inputs of the other microcomputers.

5. The microcomputer system according to claim 1, further including a flank-triggered address storer between the parameter storer and the combined address and data bus.

6. Microcomputer system according to claim 5 wherein each microcomputer has restart output means, which are connected with unmaskable interrupt inputs of the other microcomputers.

7. The microcomputer system according to claim 5 further including a control line between the first microcomputer and the parameter storer for some of the address bits.

8. Microcomputer system according to claim 7 wherein each microcomputer has restart output means, which are connected with unmaskable interrupt inputs of the other microcomputers.

9. Microcomputer system of claim 1 wherein each of said microcomputers is a one chip microcomputer.

* * * * *